(12) United States Patent
Zhao

(10) Patent No.: US 10,969,946 B2
(45) Date of Patent: Apr. 6, 2021

(54) METHODS, DEVICES, AND SYSTEMS FOR CONTROLLING MOVEMENT OF A MOVING OBJECT

(71) Applicant: SZ DJI TECHNOLOGY CO., LTD., Shenzhen (CN)

(72) Inventor: Kaiyong Zhao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/254,272

(22) Filed: Jan. 22, 2019

(65) Prior Publication Data

US 2019/0155487 A1 May 23, 2019

Related U.S. Application Data

(63) Continuation of application No. PCT/CN2016/091633, filed on Jul. 25, 2016.

(51) Int. Cl.
*G06F 3/0484* (2013.01)
*G06F 3/0488* (2013.01)
*G05D 1/00* (2006.01)
*G06T 7/20* (2017.01)
(Continued)

(52) U.S. Cl.
CPC ....... *G06F 3/04842* (2013.01); *G05D 1/0016* (2013.01); *G05D 1/0094* (2013.01); *G06F 1/163* (2013.01); *G06F 3/011* (2013.01); *G06F 3/0488* (2013.01); *G06F 3/04883* (2013.01); *G06T 7/20* (2013.01); *G06T 2207/10032* (2013.01)

(58) Field of Classification Search
CPC .......... G06F 2203/04104; G06F 3/048; G06F 3/0414–04146; G06F 3/011–15; G05D 1/0094; G05D 1/011–015
See application file for complete search history.

(56) References Cited

U.S. PATENT DOCUMENTS 9,244,549 B2 * 1/2016 Lee .................. G06F 3/041
2007/0247435 A1 * 10/2007 Benko .............. G06F 3/0488
345/173

(Continued)

FOREIGN PATENT DOCUMENTS

CN 102483674 A 5/2012
CN 102763405 A 10/2012
(Continued)

OTHER PUBLICATIONS

The World Intellectual Property Organization (WIPO) International Search Report for PCT/CN2016/091633 dated May 2, 2017 5 pages.

*Primary Examiner* — Jennifer N To
*Assistant Examiner* — Liang Y Li
(74) *Attorney, Agent, or Firm* — Anova Law Group, PLLC

(57) ABSTRACT

A method for controlling movement of a moving object includes, based on a target object selecting operation, a center point of a target object range on a display interface and a target-object-range adjusting pressure for adjusting the target object range, determining the target object range in the display interface according to the center point of the target object range and the target-object-range adjusting pressure, and determining an image object in the target object range as a target object tracked by the moving object.

7 Claims, 9 Drawing Sheets

(51) Int. Cl.
    *G06F 3/01*     (2006.01)
    *G06F 1/16*     (2006.01)

(56) References Cited

U.S. PATENT DOCUMENTS

| | | | |
|---|---|---|---|
| 2010/0286859 A1* | 11/2010 | Feigh | G08G 5/006 701/25 |
| 2014/0198071 A1* | 7/2014 | Algreatly | G06F 3/04142 345/173 |
| 2015/0106010 A1* | 4/2015 | Martin | G08G 1/0129 701/410 |
| 2015/0338942 A1* | 11/2015 | Stone | G06F 3/0488 345/173 |
| 2016/0188181 A1* | 6/2016 | Smith | G06F 3/016 715/765 |
| 2016/0191793 A1* | 6/2016 | Yang | H04W 4/02 348/207.11 |
| 2016/0352992 A1* | 12/2016 | Saika | F16M 11/041 |
| 2017/0031503 A1* | 2/2017 | Rosenberg | G06F 3/04144 |
| 2018/0217589 A1* | 8/2018 | Kim | H04N 5/23293 |

FOREIGN PATENT DOCUMENTS

| | | |
|---|---|---|
| CN | 103501393 A | 1/2014 |
| CN | 104781781 A | 7/2015 |
| CN | 105049732 A | 11/2015 |
| CN | 105100609 A | 11/2015 |
| CN | 105549604 A | 5/2016 |
| CN | 105554480 A | 5/2016 |
| CN | 105681657 A | 6/2016 |

* cited by examiner

METHODS, DEVICES, AND SYSTEMS FOR CONTROLLING MOVEMENT OF A MOVING OBJECT

CROSS-REFERENCE TO RELATED APPLICATION

This application is a continuation application of International Application No. PCT/CN2016/091633, filed on Jul. 25, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the field of unmanned aerial vehicle (UAV) technology and, more particularly, to methods, devices, and systems for controlling movement of a moving object.

BACKGROUND

An existing UAV captures images through one or more cameras installed on the UAV. The images can be displayed on a touch screen for displaying to a user. If the user is interested in an object in the images, a frame drawing operation can be performed around the object through the touch screen, such that the object can be selected in the frame drawn by the user. The UAV takes the selected object in the frame as a target object, and follows and photographs the target object. As such, the user can obtain clearer pictures and videos of the target object.

However, in the existing techniques, the user needs to select the target object through a frame drawing operation which is complicated. Further, the selection of the target object may not be accurate enough.

SUMMARY

In accordance with the disclosure, there is provided a method for controlling movement of a moving object. The method includes obtaining, based on a target object selecting operation, a center point of a target object range on a display interface and a target-object-range adjusting pressure for adjusting the target object range, determining the target object range in the display interface according to the center point of the target object range and the target-object-range adjusting pressure, and determining an image object in the target object range as a target object tracked by the moving object.

Also in accordance with the disclosure, there is provided an apparatus for controlling movement of a moving object. The apparatus includes a memory storing a computer program and a control device configured to execute the computer program to obtain, based on a target object selecting operation, a center point of a target object range on a display interface and a target-object-range adjusting pressure for adjusting the target object range, determine the target object range in the display interface according to the center point of the target object range and the target-object-range adjusting pressure, and determine an image object in the target object range as a target object tracked by the moving object.

Also in accordance with the disclosure, there is provided a movement control system including a control device and a moving object. The control device is configured to obtain based on a target object selecting operation, a center point of a target object range on a display interface and a target-object-range adjusting pressure for adjusting the target object range, determine the target object range in the display interface according to the center point of the target object range and the target-object-range adjusting pressure, determine an image object in the target object range as a target object tracked by the moving object, and send a target object control command to the moving object. The target object control command is configured to control the moving object to determine the image object in the target object range on the display interface as the target object. The moving object is configured to receive the target object control command and track the target object based on the target object control command.

DETAILED DESCRIPTION OF THE EMBODIMENTS

Technical solutions of the present disclosure will be described with reference to the drawings. It will be appreciated that the described embodiments are part rather than all of the embodiments of the present disclosure. Other embodiments conceived by those having ordinary skills in the art on the basis of the described embodiments without inventive efforts should fall within the scope of the present disclosure.

Exemplary embodiments will be described with reference to the accompanying drawings, in which the same numbers refer to the same or similar elements unless otherwise specified.

As used herein, when a first assembly is referred to as "fixed to" a second assembly, it is intended that the first assembly may be directly attached to the second assembly or may be indirectly attached to the second assembly via another assembly. When a first assembly is referred to as "connecting" to a second assembly, it is intended that the first assembly may be directly connected to the second assembly or may be indirectly connected to the second assembly via a third assembly between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

In accordance with various embodiments, the present disclosure provides methods, devices, and systems for controlling movement of a moving object. The disclosed method for controlling movement of a moving object can be applied to unmanned aerial vehicles (UAVs). That is, the moving object can be, but not limited to, a UAV.

A UAV can capture images by using one or more cameras on the UAV during the flight. The signal of the images captured by the UAV can be transmitted to a control device. The control device can receive the signal and control a display screen to display the images. A user can select a target object in the images through the control device, such that the UAV can perform a tracking flight to the target object. Further, the user can adjust the speed of UAV, as well as the photographing parameters of the one or more cameras of the UAV though the control device. Based on the selected target object, the adjusted speed, and/or the photographing parameters of the one or more cameras, corresponding control signals can be transmitted from the control device to the UAV. The UAV can receive the control signals and can perform corresponding operations based on the control signals.

Figure 1:
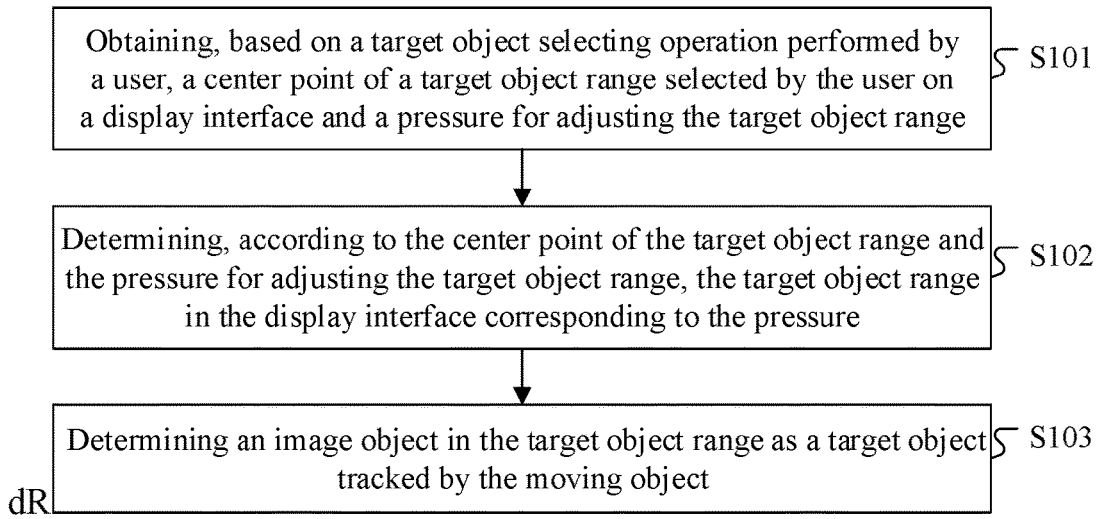
FIG. 1 illustrates a schematic flow diagram of an example of method for controlling movement of a moving object in accordance with the present disclosure.

FIG. 1 illustrates a schematic flow diagram of an example of method for controlling movement of a moving object in accordance with the present disclosure. As shown, the method for controlling movement of a moving object includes the following processes.

At S101, based on a target object selecting operation performed by a user, a center point of a target object range selected by the user on a display interface and a pressure for adjusting the target object range are obtained. The pressure for adjusting the target object range is also referred to as a "target-object-range adjusting pressure."

In some embodiment, an image captured by one or more cameras can be displayed on the display interface. In response to receiving the target object selecting operation, an operation interface for selecting a target object in the picture and/or video can be displayed on the display interface.

Based on the target object selecting operation, the center point of the target object range and the pressure applied by the user can be obtained. The pressure of the target object selecting operation can indicate an adjustment to the target object range.

At S102, according to the center point of the target object range and the pressure for adjusting the target object range, the target object range in the display interface corresponding to the pressure is determined.

In some embodiments, the center point and/or a size of the target object range can be adjusted based on the pressure applied by the user for adjusting the target object range. The pressure for adjusting the target object range corresponds to the size of the target object range and/or the center point. Different pressures correspond to different sizes of the target object range and/or different locations of the center point. As such, the target object range corresponding to the pressure can be determined.

At S103, an image object in the target object range is determined as a target object tracked by the moving object. The target object tracked by the moving object is also referred to as a "tracked target object of the moving object" or simply a "tracked target object."

In some embodiments, after the target object range is determined, an image recognition process can be performed on the image in the target object range to determine an image object. The image object can be targeted as the tracked target object of the moving object. The moving object can automatically change its moving direction and/or speed to follow the tracked target object.

In some embodiments, the moving object can be an unmanned aerial vehicle (UAV). The UAV can fly to track the image target in the target object range. For example, the target object range encompasses a moving vehicle. The moving vehicle can be determined as the tracked target object of the UAV Optionally, images captured by the moving object during the tracking movement of the moving object with respect to the tracked target object can be displayed on the display interface after process S103. For example, during the flight of the UAV when the UAV is tracking the tracked target object, one or more cameras of the UAV can capture images of the tracked target object. The captured images can be displayed on the display interface.

In some implementations, determining the image object in the target object range as the target object tracked by the moving object (S103) includes obtaining a center point of a pressure area applied by the user for adjusting the target object based on a target object adjusting operation performed by the user, and determining the image object in the target object range and corresponding to the center point of the pressure area for adjusting the target object as the target object tracked by the moving object.

Optionally, the display interface can be presented by virtual reality (VR) glasses. The press operation can be inputted by using a pressure ball or a pressure sensitive sheet.

Accordingly, in the disclosed method for controlling movement of a moving object, a center point of the target object range and a pressure for adjusting a size of the target object range can be obtained. A size of the target object range can be adjusted based on the pressure while the center point being maintained unchanged. As such, the target object range corresponding to the pressure can be obtained, and an image object in the target object range can be selected as a target object. Thus, the selection of the target object can be accurate, and the operation for the selection can be simple.

Figure 2:
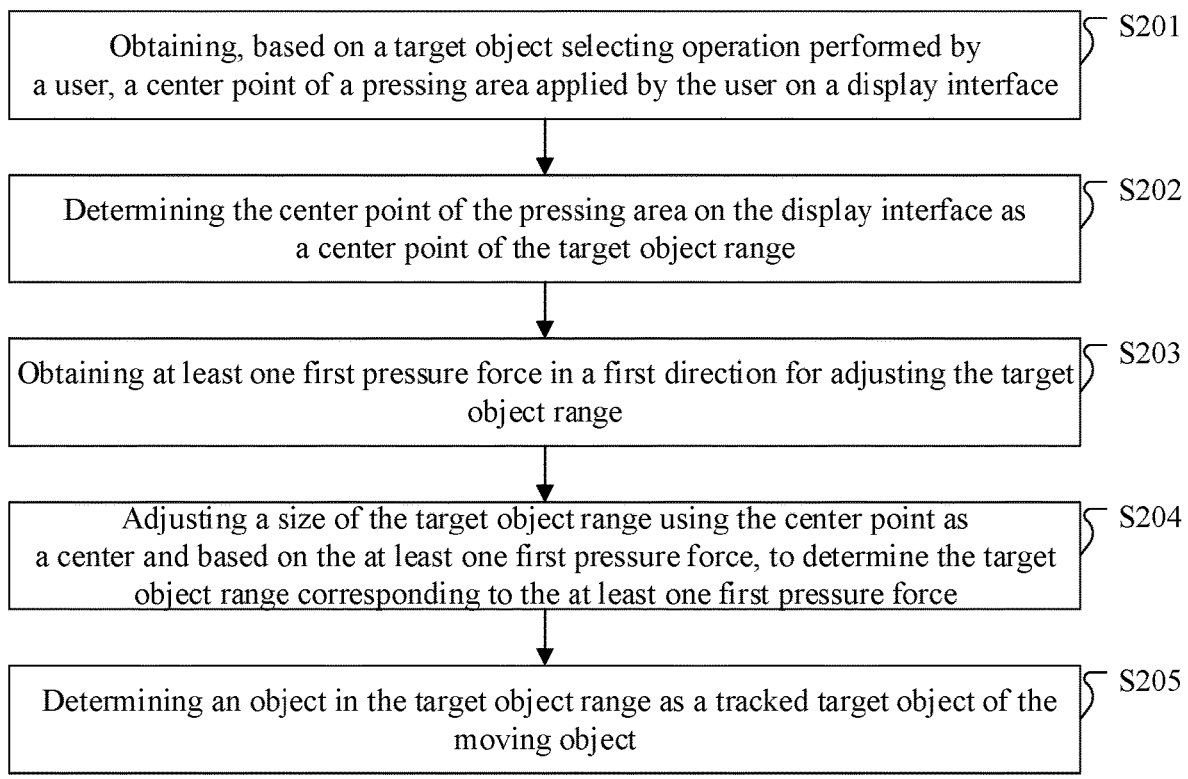
FIG. 2 illustrates a schematic flow diagram of another example of method for controlling movement of a moving object in accordance with the present disclosure.

FIG. 2 illustrates a schematic flow diagram of another example of method for controlling movement of a moving object in accordance with the present disclosure. As shown, the method for controlling movement of a moving object includes the following processes.

At S201, based on a target object selecting operation performed by a user, a center point of a pressure area applied by the user on a display interface is obtained.

At S202, the center point of the pressure area on the display interface is determined as a center point of the target object range.

In some embodiments, the display interface can be displayed on a force touch screen that can sensor the pressure applied on the display interface. Thus, based on the target object selecting operation performed by the user, the pressure area on the display interface can be obtained, and the center point of the pressure area can also be obtained. As such, the center point of the pressure area on the display interface can be determined as the center point of the target object range.

In some other embodiments, a preset center point of the display interface can be determined as the center point of the target object range.

At S203, at least one first pressure force in a first direction for adjusting the target object range is obtained.

In some embodiments, the first direction can be perpendicular to the display interface.

At S204, a size of the target object range is adjusted using the center point as a center and based on the at least one first pressure force, to determine the target object range corresponding to the at least one first pressure force.

In some embodiments, the center point of the target object range is not adjusted. The size of the target object range can be adjusted based on a magnitude of the at least one first pressure force. For example, the size of the target object range can be increased or decreased to obtain the target object range corresponding to the least one first pressure force.

Optionally, a number of the least one first pressure force can be N, which is an integer larger than or equal to 2. In some embodiments, an average of the N first pressure forces can be calculated. The average can be used as the pressure to adjust the target object range. In some other embodiments, a sum of the N first pressure forces can be calculated. The sum can be used as the pressure to adjust the target object range.

For example, N can be equal to 2. After the center point of the target object range is obtained, a pressure force applied on an upper surface of the display interface and pointing perpendicularly downward can be obtained, and a pressure force applied on a lower surface of the interface and pointing perpendicularly upward can be obtained. An average or a sum of the two pressure forces can be calculated, which can be used as the pressure to adjust the target object range.

As another example, N can be equal to 3. After the center point of the target object range is obtained, three pressure forces applied on a same surface of the display interface and perpendicular to the display interface can be obtained. The directions of the three pressure forces can be vertical to the display interface. An average or a sum of the three pressure forces can be calculated to obtain the pressure to adjust the target object range.

At S205, an object in the target object range is determined as a tracked target object of the moving object.

Corresponding description of the embodiments above in connection with FIG. 1 can be referred to for the implementation of process S205, and the detailed description thereof is omitted.

In some embodiments, the display interface can be presented by virtual reality (VR) glasses. The at least one pressure force can be inputted by using a pressure ball or a pressure sensitive sheet.

Accordingly, in the disclosed method for controlling movement of a moving object, a center point of a pressure area applied by a user on a display interface can be used as a center point for selecting a target object range. At least one first pressure force applied on the display interface in a first direction can be obtained. A size of the target object range can be obtained using the center point as a center to determine a size of the target object range. An image object in the target object range can be selected as a target object. Thus, the selection of the target object can be accurate, and the operation for the selection can be simple.

Figure 3:
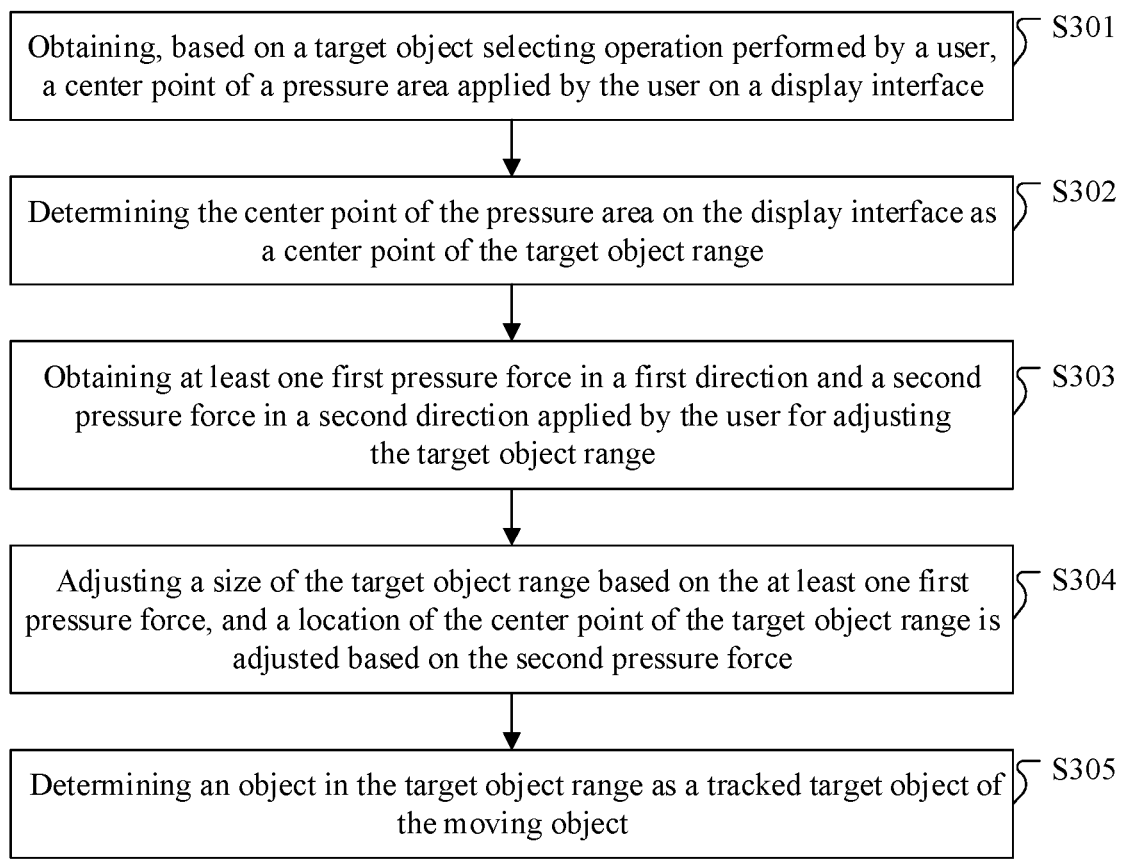
FIG. 3 illustrates a schematic flow diagram of another example of method for controlling movement of a moving object in accordance with the present disclosure.

FIG. 3 illustrates a schematic flow diagram of another example of method for controlling movement of a moving object in accordance with the present disclosure. As shown, the method for controlling movement of a moving object includes the following processes.

At S301, based on a target object selecting operation performed by a user, a center point of a pressure area applied by the user on a display interface is obtained.

At S302, the center point of the pressure area on the display interface is determined as a center point of the target object range.

Corresponding description of the embodiments above in connection with FIG. 2 can be referred to for the implementations of processes S301 and S302, and detailed description thereof is omitted.

At S303, at least one first pressure force in a first direction and a second pressure force in a second direction applied by the user for adjusting the target object range are obtained.

In some embodiments, the first direction can be perpendicular to the display interface, and the second direction can be parallel to the display interface.

At S304, a size of the target object range is adjusted based on the at least one first pressure force, and a location of the center point of the target object range is adjusted based on the second pressure force.

In some embodiments, the at least one first pressure force in the first direction can be used to adjust the size of the target object range, and the second pressure force in the second direction can be used to adjust the location of the center point of the target object range. For example, the second direction is a rightward direction, so that the location of the center point of the target object range can be moved towards right. Accordingly, the entire target object range can be moved towards right. A distance for moving the center point of the target object range can correspond to a distance of the movement of the second pressure force in the second direction.

In some embodiments, the size of the target object range can be adjusted before adjusting the center point of the target object range. Specifically, the at least one first pressure force in the first direction can be obtained, and the size of the target object range can be adjusted based on a magnitude of the at least one first pressure force with the center point of the target object range being fixed. Then the second pressure force in the second direction can be obtained. The location of the center point of the target object range can be adjusted based on the second pressure force.

In some other embodiments, the size of the target object range can be adjusted after adjusting the center point of the target object range. Specifically, the second pressure force in the second direction can be obtained. The location of the center point of the target object range can be adjusted rightward based on the second pressure force. Then, the first pressure force in the first direction can be obtained. The center point of the target object range can be fixed. The size of the target object range can be adjusted based on the magnitude of the at least one first pressure force.

Optionally, a number of the least one first pressure force can be N, which is an integer larger than or equal to 2. In some embodiments, an average of the N first pressure forces can be calculated. The average can be used as the pressure for adjusting the target object range. In some other embodiments, a sum of the N first pressure forces can be calculated. The sum can be used as the pressure for adjusting the target object range.

At S305, an object in the target object range is determined as a tracked target object of the moving object.

Corresponding descriptions of the embodiments above in connection with FIG. 1 can be referred to for the implementation of process S305, and detailed description thereof is omitted.

In some embodiments, the display interface can be presented by virtual reality (VR) glasses. The pressure forces can be inputted by using a pressure ball or a pressure sensitive sheet.

Accordingly, in the disclosed method for controlling movement of a moving object, a center point of a pressure area applied by a user on a display interface can be obtained as a center point for selecting a target object range. At least one first pressure force in a first direction can be obtained for adjusting a size of the target object range. A second pressure force in a second direction can be obtained for adjusting a location of the center point of the target object range. As such, the target object range corresponding to the at least one first pressure force and the second pressure force can be determined. An image object in the target object range can be selected as a target object. Thus, the selection of the target object can be accurate, and the operation for the selection can be simple.

Figure 4:
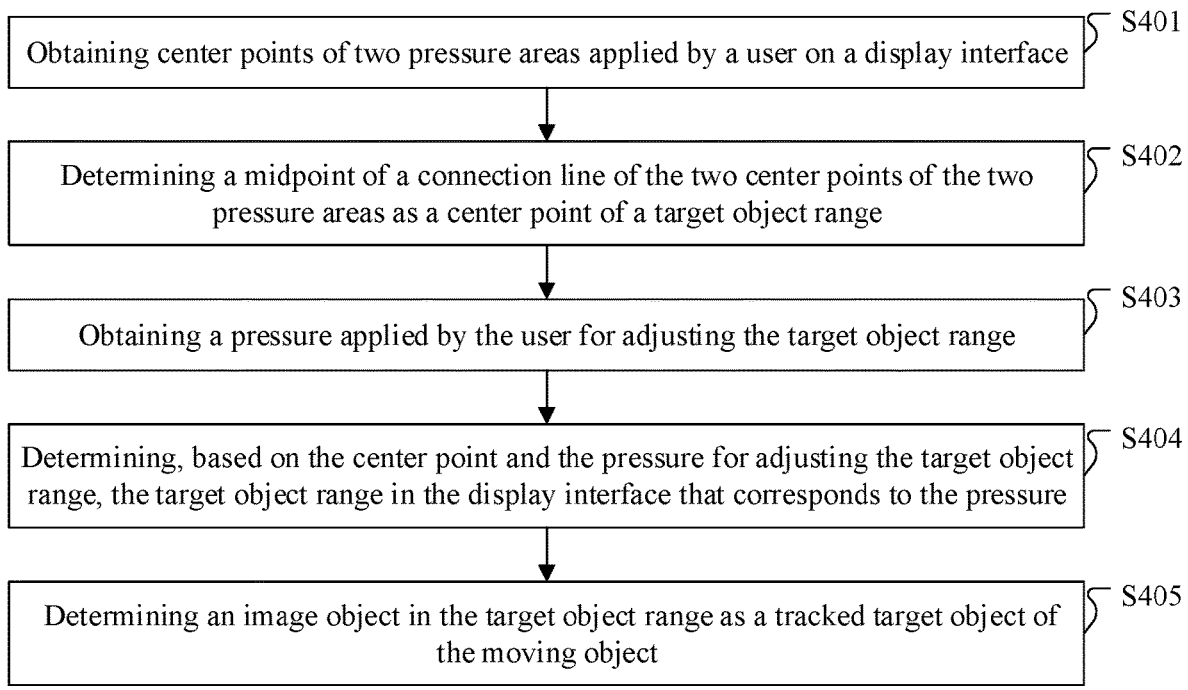
FIG. 4 illustrates a schematic flow diagram of another example of method for controlling movement of a moving object in accordance with the present disclosure.

FIG. 4 illustrates a schematic flow diagram of another example of method for controlling movement of a moving object in accordance with the present disclosure. As shown, the method for controlling movement of a moving object includes the following processes.

At S401, center points of two pressure areas applied by a user on a display interface are obtained.

At S402, a target object range is determined based on the center points of the two pressure areas. A center point of the target object range is located at a midpoint of a connection line segment connecting the two center points of the two pressure areas.

In some embodiments, two pressure areas applied by a user on a display interface can be obtained. A center point of each of the two pressure areas can be obtained. The target object range can be determined based on the two center points of the two pressure areas. A center point of the target object range can be located at an intermediate position of the connection line segment connecting the two center points of the two pressure areas.

For example, the target object range can have a rectangular shape. The two center points of the two pressure areas can be two diagonal points of the rectangular target object range, and the center point of the target object range can be at a midpoint of a diagonal of the rectangle. As another example, the target object range can have a circular shape. The two center points of the two pressure areas can be at a periphery of the circle, and the connection line segment connecting the two center points of the two pressure areas can be a diameter line of the circle. The center point of the target object range can be a center of the circle.

At S403, a pressure applied by the user for adjusting the target object range is obtained.

At S404, based on the center point and the pressure for adjusting the target object range, the target object range in the display interface that corresponds to the pressure is determined.

Processes S403 and S404 may be implemented in one of different manners, as described in detail below.

In some implementations, the pressure for adjusting the target object range includes pressure forces of the two pressure areas. The two pressure forces are both in a first direction which is perpendicular to the display interface. An average or a sum of the two pressure forces can be calculated and used to adjust the size of the target object range using the center point of the target object range determined at S402 as a center, i.e., the center point can be fixed. As such, the target object range corresponding to the two pressure forces in the first direction can be obtained.

In some other implementations, the pressure for adjusting the target object range includes pressure forces of the two pressure areas. The pressure forces include at least one pressure force in a second direction. That is, the pressure for adjusting the target object range includes a pressure force of one pressure area in the second direction or a pressure force of the other pressure area in the second direction or pressure forces of both pressure areas in the second direction. The second direction can be parallel to the display interface. A location of the center point of the target object range can be adjusted based on the at least one pressure force in the second direction to obtain the target object range corresponding to the at least one pressure force in the second direction. The target object range after the adjustment can have a same size as that determined at S402, but can have the center point at a different location. As such, the target object range can be obtained.

In some other implementations, the pressure for adjusting the target object range includes pressure forces of the two pressure areas. The pressure force of each pressure area includes a pressure force in the first direction, and at least one of the pressure forces of the two pressure areas includes a pressure force in the second direction. That is, the pressure for adjusting the target object range includes two pressure forces in the first direction, and a pressure force of one pressure area in the second direction or a pressure force of the other pressure area in the second direction or pressure forces of both pressure areas in the second direction. The first direction can be perpendicular to the display interface, and the second direction can be parallel to the display interface. An average or a sum of the two pressure forces in the first direction can be calculated. The size of the target object range can be adjusted according to the average or the sum of the two pressure forces in the first direction and using the center point of the target object range determined at S402 as a center, i.e., the location of the center point can be fixed. Then, the location of the center point of the target object range can be adjusted based on the at least one pressure force in the second direction. As such, the target object range corresponding to the two pressure forces in the first direction and the at least one pressure force in the second direction can be obtained.

In some other implementations, the pressure for adjusting the target object range includes pressure forces of the two pressure areas. The pressure force of each pressure area includes a pressure force in the first direction, and at least one of the pressure forces of the two pressure areas includes a pressure force in the second direction. That is, the pressure for adjusting the target object range includes two pressure forces in the first direction, and a pressure force of one pressure area in the second direction or a pressure force of the other pressure area in the second direction or pressure forces of both pressure areas in the second direction. The first direction can be perpendicular to the display interface, and the second direction can be parallel to the display interface. The location of the center point of the target object range can be first adjusted based on the at least one pressure force in the second direction. Then, an average or a sum of the two pressure forces in the first direction can be calculated. The size of the target object range can be adjusted according to the average or the sum of the two pressure forces in the first direction and using the adjusted center point as a center. As such, the target object range corresponding to the two pressure forces in the first direction and the at least one pressure force in the second direction can be obtained.

At S405, an image object in the target object range is determined as a tracked target object of the moving object.

Corresponding descriptions of the embodiments above in connection with FIG. 1 can be referred to for the implementation of process S405, and detailed description thereof is omitted.

In some embodiments, the display interface can be presented by virtual reality (VR) glasses. The pressure forces can be inputted by using a pressure ball or a pressure sensitive sheet.

Accordingly, in the disclosed method for controlling movement of a moving object, center points of two pressure areas applied by a user on the display interface can be obtained and used for determining a center point of a target object range. A pressure applied by the user for adjusting the target object range can be obtained. The target object range on the display interface can be determined based on the center point of the target object range and the pressure for adjusting the target object range. An image object in the target object range can be selected as a target object. Thus, the selection of the target object can be accurate, and the operation for the selection can be simple.

Figure 5:
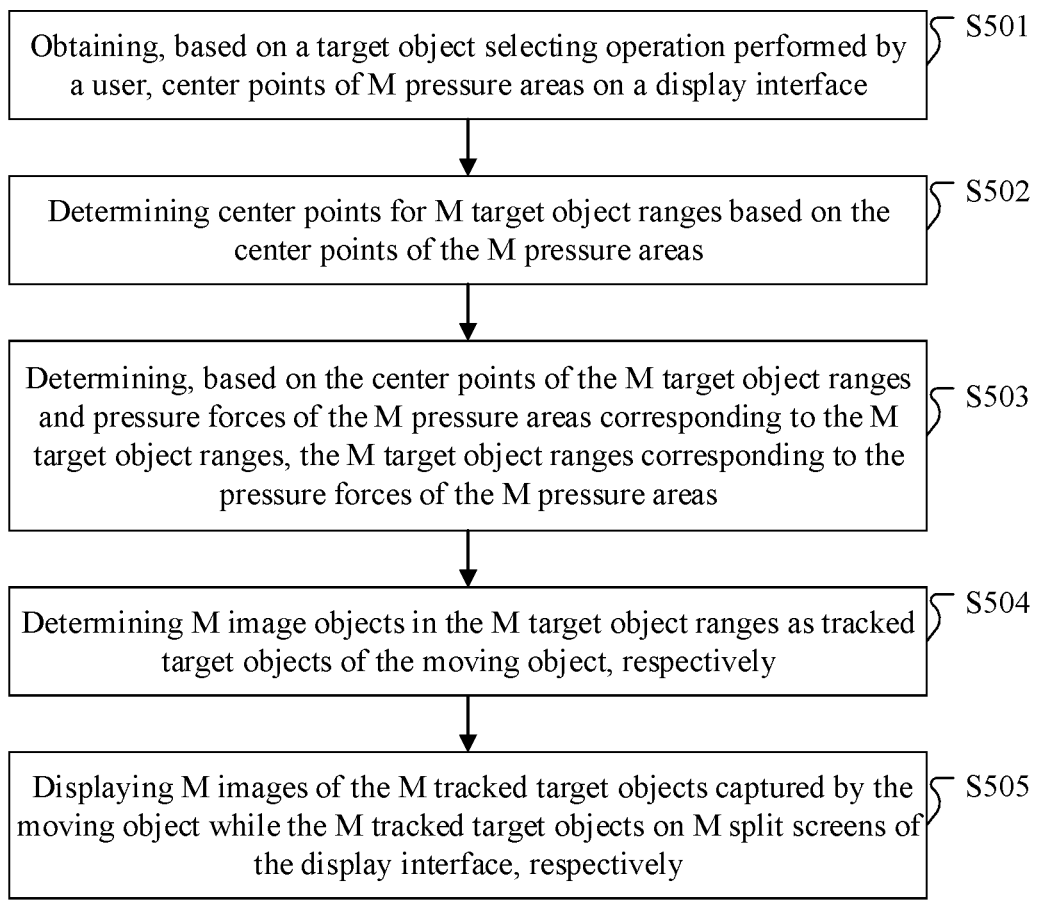
FIG. 5 illustrates a schematic flow diagram of another example of method for controlling movement of a moving object in accordance with the present disclosure.

FIG. 5 illustrates a schematic flow diagram of another example of method for controlling movement of a moving object in accordance with the present disclosure. As shown, the method for controlling movement of a moving object includes the following processes.

At S501, center points of M pressure areas on a display interface are obtained.

The number M can be an integer larger than or equal to 1.

At S502, center points for M target object ranges are determined based on the center points of the M pressure areas.

In some embodiments, the M pressure areas can be located at different positions of the display interface. The center point of each of the M pressure areas can be determined as the center point of one target object range.

At S503, based on the center points of the M target object ranges and pressure forces of the M pressure areas corresponding to the M target object ranges, the M target object ranges corresponding to the pressure forces of the M pressure areas are determined.

In some embodiments, the target object range corresponding to the pressure of each pressure area in the display interface can be determined based on the corresponding center point of the target object range and the pressure force of the pressure area corresponding to the center point.

At S504, M image objects in the M target object ranges are determined as tracked target objects of the moving object, respectively.

In some embodiments, after M target object ranges are determined, an image target of each of the M target object ranges can be determined. As such, the M objects in the M target object ranges can be determined as M tracked target objects of the moving object.

Optionally, the method can further include the following process.

At S505, M images of the M tracked target objects captured by the moving object while the M tracked target objects are displayed on M split screens of the display interface, respectively. For example, when the moving object is tracking the M target objects after determining the M target object, the moving object can capture images of the M target objects and display the M images on the display interface. For example, the display interface can include M regions for displaying the captured images of the M target objects, respectively.

In some embodiments, the display interface can be presented by virtual reality (VR) glasses. The pressure forces can be inputted by using a pressure ball or a pressure sensitive sheet.

Accordingly, in the disclosed method for controlling movement of a moving object, multiple center points of multiple pressure areas applied by a user on a display interface can be obtained as multiple center points of multiple target object ranges. Multiple pressure forces of the multiple pressure areas can be obtained for adjusting sizes of the multiple target object ranges, respectively. As such, the multiple target object ranges corresponding to the multiple pressure forces can be determined. Multiple image objects in the multiple target object ranges can be selected as target objects. Thus, multiple target objects can be selected, the selection of the multiple target objects can be accurate, and the operation for the selection can be simple.

Figure 6:
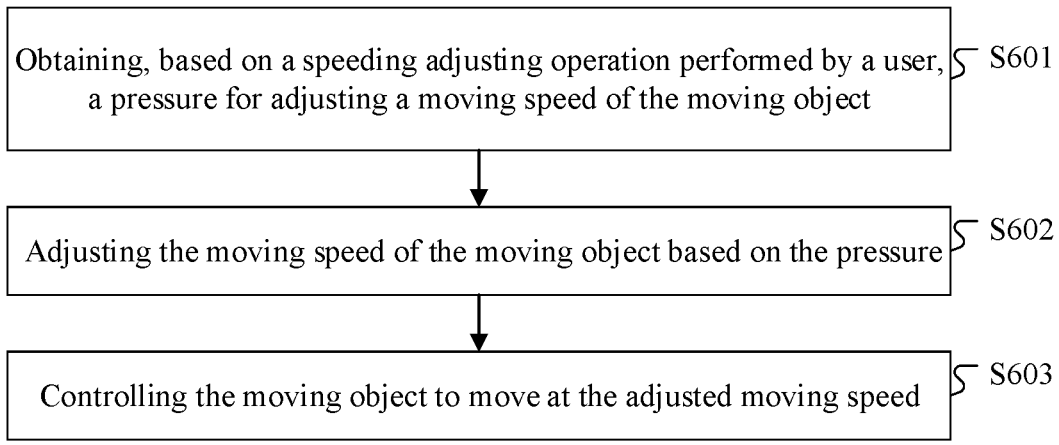
FIG. 6 illustrates a schematic flow diagram of another example of method for controlling movement of a moving object in accordance with the present disclosure.

FIG. 6 illustrates a schematic flow diagram of another example of method for controlling movement of a moving object in accordance with the present disclosure. As shown, the method for controlling movement of a moving object includes the following processes.

At S601, based on a speed adjusting operation performed by a user, a pressure for adjusting a moving speed of the moving object is obtained. The pressure for adjusting the moving speed of the moving object is also referred to as a "speed adjusting pressure."

At S602, the moving speed of the moving object is adjusted based on the pressure.

At S603, the moving object is controlled to move at the adjusted moving speed.

In some embodiments, the moving object can be a UAV, and the moving speed can be a flight speed of the UAV. A speed adjusting operation can be inputted by the user. Based on the speed adjusting operation, the pressure applied by the used for adjusting the moving speed of the moving object can be obtained.

In response to receiving the speed adjusting operation, the display interface can display an operation interface for adjusting the flight speed. In the operation interface, one or more pressure forces applied by the user can be obtained to adjust the flight speed. According to the one or more pressure forces, the flight speed of the UAV can be adjusted, and the UAV can be controlled to fly at the adjusted flight speed.

Optionally, when there are multiple pressure forces applied by the user, an average or a sum of the multiple pressure forces can be calculated and the moving speed of the moving object can be adjusted based on the average or the sum of the multiple pressure forces.

In some embodiments, a sliding up operation or a sliding down operation on the touch screen can be used to adjust the moving speed of moving objects. However, a sliding distance in the sliding process may not be exactly controlled, resulting in an inaccurate adjustment of the moving speed. In some embodiments described above, the moving speed can be adjusted by the one or more pressure forces. Thus, the adjustment of the moving speed can be more accurate, and the adjustment operation can be simple.

The process S602 can have multiple implementations which are described in detail in the following.

In some implementations, based on the one or more pressure forces for adjusting the moving speed, a speed increment corresponding to the one or more pressure forces can be obtained. A sum of a current speed of the moving object and the speed increment can be calculated and used as the adjusted moving speed. Specifically, the magnitude of a pressure force can correspond to the speed increment. The speed increment can be determined based on the pressure force. A sum of the current speed of the moving object and the speed increment can be calculated and used as the adjusted moving speed. The moving object can be controlled to move at the adjusted moving speed. It is noted that, the speed increment can be either positive or negative. Additionally, the pressure force for adjusting the moving speed can be an average or a sum of multiple pressure forces applied by the user for adjusting the moving speed.

In some other implementations, based on the one or more pressure forces for adjusting the moving speed, an acceleration corresponding to the one or more pressure forces can be obtained. The adjusted moving speed can be calculated based on a current speed of the moving object and the acceleration. Specifically, the magnitude of a pressure force can correspond to the acceleration. The acceleration can be determined based on the pressure force. The adjusted moving speed can be calculated based on a current speed of the moving object and the acceleration. The moving object can be controlled to move at the adjusted moving speed. Additionally, the pressure force can be an average or a sum of multiple pressure forces for adjusting the moving speed.

In some other implementations, obtaining the pressure for adjusting the moving speed of the moving object at S601 can include the following processes. An initial pressure corresponding to a current speed of the moving object can be obtained. Then, a current pressure decreasing from the initial pressure can be obtained. Specifically, the magnitude of the pressure can correspond to the speed of the moving object. In some embodiments, the initial pressure corresponding to the initial speed of the moving object can be obtained. For example, when the user applies the initial pressure corresponding to the current speed of the moving object, a prompt message can indicate to the user that the initial pressure corresponds to the current speed of the moving object. The user can decrease the pressure from the initial pressure to control the moving object to slow down. That is, the current pressure decreasing from the initial pressure can be obtained. Correspondingly, process S602 can include controlling the moving object to reduce the moving speed based on the current pressure. For example, a different between the current pressure and the initial pressure can be calculated and used to determine a speed difference. The adjusted speed of the moving object can be calculated by subtracting the speed difference from the current speed of the moving object. The initial pressure can be an average or a sum of multiple initial pressure forces. The current pressure can be an average or a sum of multiple current pressure forces.

In some other implementations, obtaining the pressure for adjusting the moving speed of the moving object at S601 can include the following processes. An initial pressure corresponding to a current speed of the moving object can be obtained. Then, a current pressure increasing from the initial pressure can be obtained. Specifically, the magnitude of the pressure can correspond to the speed of the moving object. In some embodiments, the initial pressure corresponding to the current speed of the moving object can be obtained. For example, when the user applies an initial pressure corresponding to the current speed of the moving object, a prompt message can indicate to the user that the initial pressure corresponds to the current speed of the moving object. The user can increase the pressure from the initial pressure to control the moving object to speed up. That is, a current pressure increased from the initial pressure can be obtained. Correspondingly, process S602 can include controlling the moving object to increase the moving speed based on the current pressure. For example, a different between the current pressure and the initial pressure can be calculated to determine a speed difference. The adjusted speed of the moving object can be calculated by adding the speed difference to the current speed of the moving object. The initial pressure can be an average or a sum of multiple initial pressure forces. The current pressure can be an average or a sum of multiple current pressure forces.

It is noted that, the pressure forces can be inputted by using a pressure ball or a pressure sensitive sheet.

In some embodiments, the method described above in connection with FIG. 6 can be combined with any of the embodiments described above in connection with FIGS. 1-5.

Figure 7:
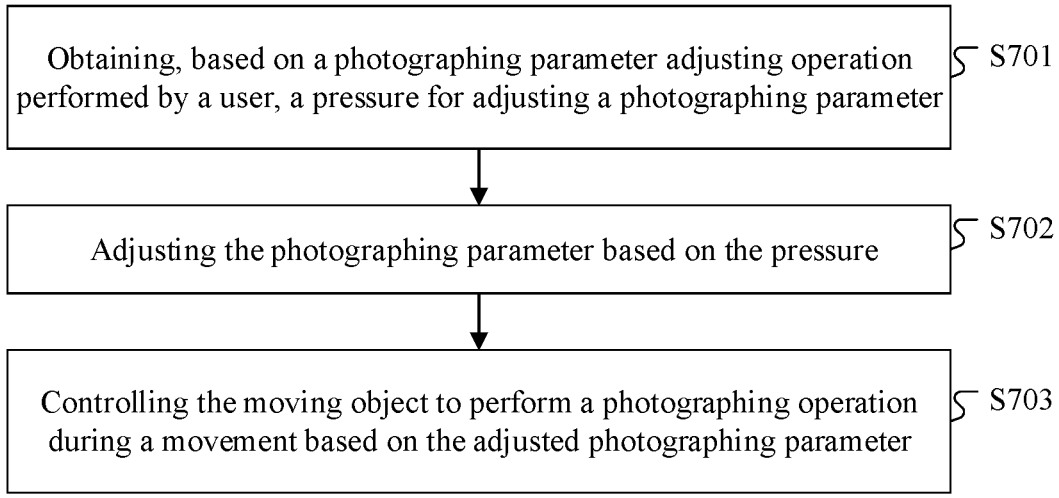
FIG. 7 illustrates a schematic flow diagram of another example of method for controlling movement of a moving object in accordance with the present disclosure.

FIG. 7 illustrates a schematic flow diagram of another example of method for controlling movement of a moving object in accordance with the present disclosure. As shown, the method for controlling movement of a moving object includes the following processes.

At S701, based on a photographing parameter adjusting operation performed by a user, a photographing parameter and a pressure for adjusting the photographing parameter is obtained. The pressure for adjusting the photographing parameter is also referred to as a "photographing-parameter adjusting pressure."

At S702, the photographing parameter is adjusted based on the pressure.

At S703, the moving object is controlled to perform a photographing operation during a movement based on the adjusted photographing parameter.

In some embodiments, the moving object can be a UAV, and the photographing parameter can be an exposure parameter. A user can input an exposure parameter adjusting operation. Based on the exposure parameter adjusting operation, the photographing parameter to be adjusted can be determined as the exposure parameter. One or more pressure forces for adjusting the exposure parameter can be obtained. In response to receiving the exposure parameter adjusting operation, the display interface can display an operation interface for adjusting the exposure parameter. In the operation interface, one or more pressure forces applied by the user can be obtained to adjust the exposure parameter. According to the one or more pressure forces, the exposure parameter can be adjusted, and the UAV can be controlled to perform a photographing operation during movement based on the adjusted exposure parameter Optionally, an implementation of process S702 can include calculating an average or a sum of multiple pressure forces for adjusting the photographing parameter, and adjusting the photographing parameter based on the average or the sum of the multiple pressure forces.

In some embodiments, a sliding up operation or a sliding down operation on the touch screen can be used to adjust the photographing parameter of moving objects. However, a sliding distance in the sliding process may not be exactly controlled, resulting in an in accurate adjustment of the photographing parameter. In some embodiments described above, the photographing parameter can be adjusted by the one or more pressure forces. Thus, the adjustment of the photographing parameter can be more accurate, and the adjustment operation can be simple.

Optionally, the process S701 can include the following processes.

At S7011, based on the photographing parameter adjusting operation performed by the user, an initially-selected photographing parameter in multiple photographing parameters displayed in the display interface and a pressure for selecting a photographing parameter are obtained. The pressure for selecting a photographing parameter is also referred to as a "photographing-parameter selecting pressure."

At S7012, a location of the initially-selected photographing parameter is adjusted based on the pressure for selecting the photographing parameter.

At S7013, the location of the initially-selected photographing parameter after the adjustment is determined as a location of the photographing parameter to be adjusted.

In some embodiments, a photographing parameter adjusting operation can be inputted by a user. In response to receiving the photographing parameter adjusting operation, multiple photographing parameters that are adjustable can be displayed in the display interface. An initially-selected photographing parameter can be obtained from the multiple photographing parameters. The initially-selected photographing parameter can be a preset photographing parameter to be adjusted, or can be a photographing parameter pre-selected by the user. If the initially-selected photographing parameter is not the photographing parameter that the user wishes to adjust, the user can adjust the initially-selected photographing parameter, i.e., the user can apply a pressure for adjusting the initially-selected photographing parameter.

Specifically, a location of the initially-selected photographing parameter can be adjusted along a direction same as a direction of the pressure. For example, when the pressure applied by the user for adjusting the initially-selected photographing parameter is in a rightward direction, the location of the initially-selected photographing parameter can be moved to the right. A moving distance of the initially-selected photographing parameter can correspond to the moving distance of the pressure in the direction. The location of the initially-selected photographing parameter after the movement can be determined as the location of the photographing parameter that the user wishes to adjust.

Optionally, process S702 can be implemented in one of multiple manners as described in detail below.

In some implementations, based on the one or more pressure forces for adjusting the photographing parameter, a parameter increment of the photographing parameter corresponding to the one or pressure forces can be obtained. A sum of a current parameter value of the photographing parameter of the moving object and the parameter increment can be calculated and used as the adjusted photographing parameter. The specific implementation is similar to the first type of implementations of process S602 described above in connection with FIG. 6, which is not repeated here.

In some other implementations, obtaining the pressure for adjusting the photographing parameter of the moving object at S701 can include obtaining an initial pressure applied by the user that corresponds to a current parameter value of the photographing parameter of the moving object can be obtained and obtaining a current pressure applied by the user that decreases from the initial pressure. Correspondingly, process S702 can include controlling the moving object to reduce the parameter value of the photographing parameter based on the current pressure. The specific implementation is similar to the third type of implementations of process S602 described above in connection with FIG. 6, which is not repeated here.

In some other implementations, obtaining the pressure for adjusting the photographing parameter of the moving object at S701 can include obtaining the initial pressure corresponding to the current parameter value of the photographing parameter of the moving object and obtaining a current pressure increasing from the initial pressure. Correspondingly, process S702 can include controlling the moving object to increase the parameter value of the photographing parameter based on the current pressure. The specific implementation can is similar to the fourth type of implementations of process S602 described above in connection with FIG. 6, which is not repeated here.

It is noted that, the pressure forces can be inputted by using a pressure ball or a pressure sensitive sheet. The display interface can be displayed by VR glasses.

In some embodiments, the method described above in connection with FIG. 7 can be combined with any of the embodiments described above in connection with FIGS. 1-5, and/or the embodiments described above in connection with FIG. 6.

Figure 8:
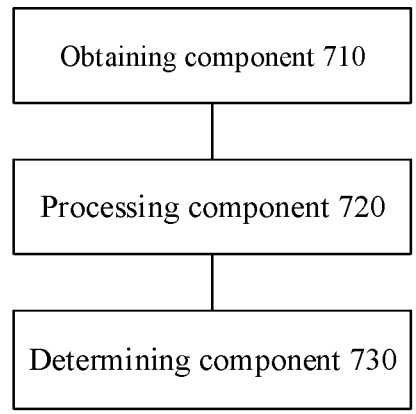
FIG. 8 illustrates a schematic structural diagram of an example of device for controlling movement of a moving object in accordance with the present disclosure.

FIG. 8 illustrates a schematic structural diagram of an example of device for controlling movement of a moving object in accordance with the present disclosure. As shown, the device for controlling movement of a moving object includes an obtaining component 710, a processing component 720, and a determining component 730.

The obtaining component 710 is configured to obtain, based on a target object selecting operation performed by a user, a center point of the target object range selected by the user on a display interface and a pressure applied by the user for adjusting the target object range. The processing component 720 is configured to determine the target object range corresponding to the pressure in the display interface according to the center point of the target object range and the pressure for adjusting the target object range. The determining component 730 is configured to determine an object in the target object range on the display interface as a tracked target object of the moving object.

The device for controlling movement of a moving object can be used to implement the method described above in connection with FIG. 1, and detailed description thereof is omitted.

Figure 9:
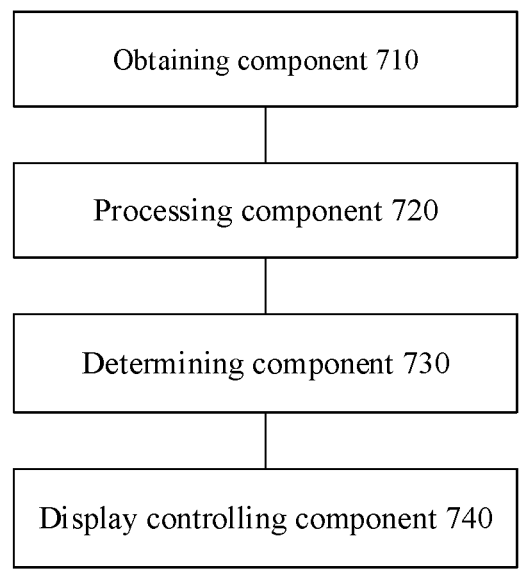
FIG. 9 illustrates a schematic structural diagram of another example of device for controlling movement of a moving object in accordance with the present disclosure.

FIG. 9 illustrates a schematic structural diagram of another example of device for controlling movement of a moving object in accordance with the present disclosure. The device shown in FIG. 9 is similar to the device shown in FIG. 8, except that the device shown in FIG. 9 further includes a display controlling component 740. The display controlling component 740 is configured to display, after determining an object in the target object range on the display interface as a tracked target object of the moving object, images captured by the moving object during the tracking movement of the moving object with respect to the tracked target object on the display interface.

In some other implementations, the obtaining component 710 is configured to obtain the center point of the target object range selected by the user on the display interface by obtaining a center point of a pressure area on the display interface, and determining the center point of the pressure area on the display interface as the center point of the target object range.

In some other implementations, the processing component 720 is further configured to, when the pressure applied by the user includes a first pressure force in a first direction, adjust a size of the target object range based on the first pressure force, and determine the target object range based on the center point of the target object range and the adjusted size of the target object range.

In some other implementations, the processing component 720 is further configured to, when the pressure applied by the user includes the first pressure force in the first direction and a second pressure force in a second direction, adjust a size of the target object range based on the first pressure force, adjust the location of the center point of the target object range according to the second pressure force, and determine the target object range based on the adjusted center point of the target object range and the adjusted size of the target object range.

In some other implementations, there are N first pressure forces in the first direction, where N is an integer larger than or equal to 2. The processing component 720 is further configured to adjust the size of the target object range based on the first pressure by calculating an average or a sum of the N first pressure forces, and adjusting a size of the target object range based on the average or the sum.

In some other implementations, the obtaining component 710 is further configured to obtain the center point of the target object range selected by the user on the display interface by obtaining center points of two pressure areas applied by the user on the display interface, and determining the target object range based on the center points of the two pressure areas. The center point of the target object range is located at a midpoint of a connection line segment connecting the two center points of the two pressure areas.

In some other implementations, the pressure applied by the user for adjusting the target object range includes pressure forces of the two pressure areas. The processing component 720 is further configured to, when the pressure forces of the two pressure areas are in the first direction, calculate an average or a sum of the pressure forces of the two pressure areas, adjust the size of the target object range based on the average or the sum, and determine the target object range based on the center point of the target object range and the adjusted size of the target object range.

In some other implementations, the processing component 720 is further configured to, when the pressure forces of the two pressure areas includes at least one pressure force in the second direction, adjust the location of the center point of the target object range based on the at least one pressure force in the second direction, and determine the target object range based on the adjusted center point of the target object range.

In some other implementations, the obtaining component 710 can be configured to obtain center points of M pressure areas respectively. The number M is an integer larger than or equal to 1. The obtaining component 710 can be further configured to determine the center points of the M pressure areas as the center points of M target object ranges, respectively. The processing component 720 can be configured to determine the M target object ranges in the display interface that correspond to the pressure forces of the M pressure areas based on the center points of the M target object ranges and the pressure forces of the M pressure areas. The determining component 730 can be configured to determine M image objects in the M target object ranges on the display interface as M tracked target objects of the moving object, respectively.

Optionally, the display controlling component 740 is further configured to, after the M tracked target objects of the moving object are determined, display, on the display interface in a split-screen manner, M images captured by the moving object while tracking the M tracked target objects. In some embodiments, M+1 target objects may be tracked and the display controlling component 740 can be configured to display, on the display interface in a split-screen manner, M+1 images captured by the moving object while tracking the M+1 tracked target objects.

The disclosed device for controlling movement of a moving object can be used to implement any embodiment of the methods described above in connection with FIGS. 2-5.

Figure 10:
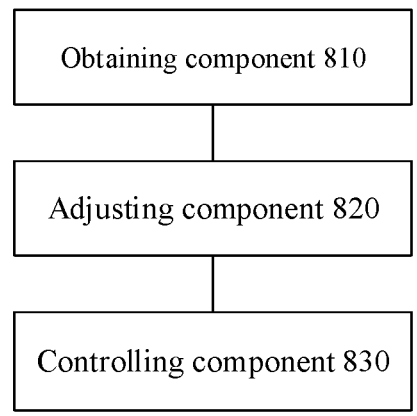
FIG. 10 illustrates a schematic structural diagram of another example of device for controlling movement of a moving object in accordance with the present disclosure.

FIG. 10 illustrates a schematic structural diagram of another example of device for controlling movement of a moving object in accordance with the present disclosure. As shown in FIG. 10, the device for controlling movement of a moving object includes an obtaining component 810, an adjusting component 820, and a controlling component 830.

The obtaining component 810 can be configured to obtain, based on a speed adjusting operation performed by a user, a pressure for adjusting a moving speed of the moving object. The adjusting component 820 can be configured to adjust the moving speed of the moving object based on the pressure. The controlling component 830 is configured to control the moving object to move at the adjusted moving speed.

In some implementations, the adjusting component 820 is further configured to, when multiple pressure forces are applied by the user, calculate an average or a sum of the multiple pressure forces and to adjust the moving speed of the moving object based on the average or the sum of the multiple pressure forces.

In some other implementations, the adjusting component 820 is further configured to obtain, based on the one or more pressure forces for adjusting the moving speed, a speed increment corresponding to the one or more pressure forces, and calculate a sum of a current speed of the moving object and the speed increment as the adjusted moving speed.

In some other implementations, the adjusting component 820 is further configured to obtain, based on the one or more pressure forces for adjusting the moving speed, an acceleration corresponding to the one or more pressure forces, and calculate the adjusted moving speed based on a current speed of the moving object and the acceleration.

In some other implementations, the obtaining component 810 is further configured to obtain an initial pressure corresponding to a current speed of the moving object, and obtain a current pressure decreasing from the initial pressure. The adjusting component 820 is further configured to control the moving object to reduce the moving speed based on the current pressure.

In some other implementations, the obtaining component 810 is further configured to obtain an initial pressure corresponding to a current speed of the moving object, and obtain a current pressure increasing from the initial pressure.

The adjusting component 820 is further configured to control the moving object to increase the moving speed based on the current pressure.

The disclosed device for controlling movement of a moving object can be used to implement any embodiment of the method described above in connection with FIG. 6.

Figure 11:
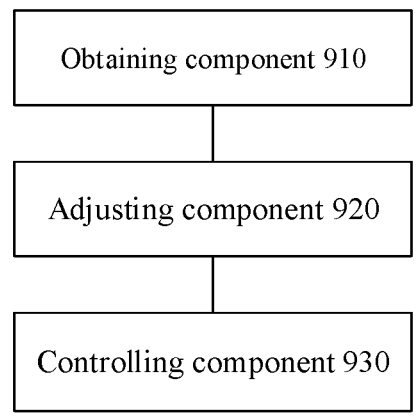
FIG. 11 illustrates a schematic structural diagram of another example of device for controlling movement of a moving object in accordance with the present disclosure.

FIG. 11 illustrates a schematic structural diagram of another example of device for controlling movement of a moving object in accordance with the present disclosure. As shown in FIG. 11, the device for controlling movement of a moving object includes an obtaining component 910, an adjusting component 920, and a controlling component 930.

The obtaining component 910 can be configured to obtain, based on a photographing parameter adjusting operation performed by a user, a photographing parameter to be adjusted and a pressure applied by the user for adjusting the photographing parameter. The adjusting component 920 can be configured to adjust the photographing parameter of the moving object based on the pressure for adjusting the photographing parameter. The controlling component 930 is configured to control the moving object to perform a photographing operation during movement based on the adjusted photographing parameter.

In some implementations, the adjusting component 920 is further configured to obtain, based on the pressure for adjusting the photographing parameter, a parameter increment of the photographing parameter corresponding to the pressure, and calculate a sum of the parameter value of the current photographing parameter of the moving object and the parameter increment as the adjusted photographing parameter.

In some other implementations, the obtaining component 910 is further configured to obtain an initial pressure applied by the user that corresponds to a current parameter value of the photographing parameter of the moving object, and obtain a current pressure applied by the user that decreases from the initial pressure. The adjusting component 920 is further configured to decrease the parameter value of the photographing parameter of the moving object based on the current pressure.

In some other implementations, the obtaining component 910 is further configured to obtain the initial pressure corresponding to the current photographing parameter of the moving object, and obtain a current pressure applied by the user that increases from the initial pressure. The adjusting component 920 is further configured to increase the parameter value of the photographing parameter ov the moving object based on the current pressure.

In some other implementations, the obtaining component 910 is further configured to obtain, based on the photographing parameter adjusting operation performed by the user, the photographing parameter to be adjusted by obtaining an initially-selected photographing parameter in multiple photographing parameters displayed in the display interface and a pressure applied by the user for selecting a photographing parameter, adjusting a location of the initially-selected photographing parameter based on a magnitude and a direction of the pressure, and determining the location of the initially-selected photographing parameter after the adjustment as a location of the photographing parameter to be adjusted.

The disclosed device for controlling movement of a moving object can be used to implement any embodiment of the method described above in connection with FIG. 7.

Figure 12:
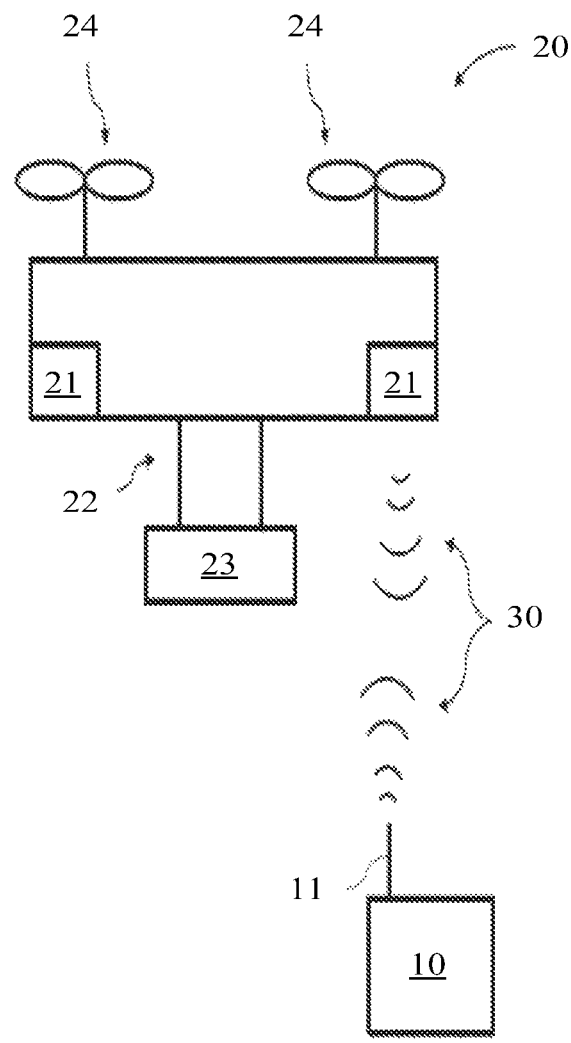
FIG. 12 illustrates a schematic structural diagram of an example of system for controlling movement of a moving object in accordance with the present disclosure.

FIG. 12 illustrates a schematic structural diagram of an example of system for controlling movement of a moving object in accordance with the present disclosure. As shown in FIG. 12, the system includes a control device 10 and a moving object 20. The control device 10 includes a transceiver 11. The moving object 21 can be, for example, a UAV, and includes a transceiver 21, a carrier 22, a load 23, and rotors 24.

In some embodiments, after the transceiver 21 of the UAV receives a control signal 30 including, for example, a target object control command, transmitted by the transceiver 11 of the control device 10, the rotors 24 of the UAV can change the steering to control the UAV to track the target object.

In some embodiments, after the transceiver 21 of the UAV receives the control signal 30 including, for example, a speed control command, transmitted by the transceiver 11 of the control device 10, the rotors 24 of the UAV can change rotational speeds to change a flying speed of the UAV.

In some embodiments, as shown in FIG. 12, the carrier 22 of the UAV carries a load 23, such as a photographing device. After the transceiver 21 of the UAV receives the control signal 30 including, for example, a photographing parameter control command, transmitted from the transceiver 11 of the control device 10. The photographing device of the UAV can change the photographing parameter based on the photographing parameter control command.

It is noted that FIG. 12 shows two rotors 24 of the UAV in a side view direction of the UAV. The UAV may have four rotors 24.

In the scenario that the control device 10 controls the moving object 20 to move for tracking a target object, the control device 10 can be configured to obtain, based on a target object selecting operation, a center point of a target object range on a display interface, and a target-object-range adjusting pressure for adjusting the target object range, determine the target object range in the display interface according to the center point of the target object range and the target-object-range adjusting pressure, and determine an image object in the target object range as a target object tracked by the moving object 20, send a target object control command to the moving object 20. The target object control command is configured to control the moving object 20 to determine the image object in the target object range on the display interface as the target object.

The moving object 20 can be configured to receive the target object control command, and move and track the image object in the target object range based on the target object control command.

In some implementations, the control device 10 is further configured to, after determining the image object in the target object range on the display interface as the tracked target object of the moving object 20, to display, on the display interface, images captured by the moving object 20 while tracking the target object.

In some other implementations, the control device 10 is further configured to obtain the center point of the target object range on a display interface by obtaining a center point of a pressure area applied by the user on the display interface, and determining the center point of the pressure area as the center point of the target object range.

In some other implementations, the control device 10 is further configured to determine the target object range by, if the target-object-range adjusting pressure includes at least one first pressure force in a first direction, adjusting a size of the target object range according to the at least one first pressure force and using the center point of the target object range as a center.

In some other implementations, the control device 10 is further configured to determine the target object range by, if the target-object-range adjusting pressure includes the at least one first pressure force in the first direction and a second pressure force in a second direction, adjusting the size of the target object range according to the at least one first pressure force, and adjusting a location of the center point of the target object range according to the second pressure force.

In some other implementations, there are N first pressure forces in the first direction and the number N is an integer larger than or equal to 2. The control device 10 can be further configured to calculate an average or a sum of the N first pressure forces, and adjust the size of the target object range based on the average or the sum.

In some embodiments, the control device 10 is configured to obtain the center point of the target object range on the display interface by obtaining center points of two pressure areas applied by the user on the display interface, and determining the target object range based on the center points of the two pressure areas. The center point of the target object range is located at a midpoint of a connection line segment connecting the two center points of the two pressure areas.

In some other implementations, the target-object-range adjusting pressure includes pressure forces of the two pressure area. The control device 10 is further configured to determine the target object range by, if the pressure forces of the two pressure areas include pressure forces in a first direction, obtaining an average or a sum of the pressure forces in the first direction, and adjusting a size of the target object range according to the average or the sum and using the center point of the target object range as a center to obtain the target object range corresponding to the pressure forces in the first direction.

In some other implementations, the control device 10 is further configured to determine the target object range by, if the pressure forces of the two pressure areas include at least one pressure force in a second direction, adjusting a location of the center point of the target object range according to the at least one pressure force in the second direction to obtain the target object range corresponding to the at least one pressure force in the second direction.

In some other implementations, the control device 10 can be further configured to obtain center points of M pressure areas respectively. The number M is an integer larger than or equal to 1. The control device 10 can be further configured to determine the center points of the M pressure areas as the center points of M target object ranges, respectively, determine the M target object ranges in the display interface that correspond to the pressure forces of the M pressure areas based on the M target object ranges and the pressure forces of the M pressure areas, and determine M image objects in the M target object ranges on the display interface as M tracked target objects of the moving object 20, respectively.

In some implementations, the control device 10 is further configured to, after determining the M tracked target objects of the moving object 20, display, on the display interface in a split-screen manner, M images captured by the moving object 20 while tracking the M tracked target objects. In some embodiments, M+1 target objects may be tracked and the control device 10 can be configured to display, on the display interface in a split-screen manner, M+1 images captured by the moving object 20 while tracking the M+1 tracked target objects.

In the scenario that the control device 10 controls the moving speed of the moving object 20, the control device 10 can be configured to obtain, based on a speed adjusting operation performed by a user, a pressure for adjusting a moving speed of the moving object 20, adjust the moving speed of the moving object 20 based on the pressure, and send a moving speed control command to the moving object 20. The moving speed control command can be used to control the moving object 20 to move at the adjusted moving speed.

The moving object 20 can be configured to receive the moving speed control command, and move at the adjusted moving speed based on the moving speed control command.

In some implementations, multiple pressure forces are applied by the user. The control device 10 can be configured to calculate an average or a sum of the multiple pressure forces and adjust the moving speed of the moving object 20 based on the average and the sum of the multiple pressure forces.

In some other implementations, the control device 10 can be configured to adjust the moving speed of the moving object 20 by obtaining, based on the pressure for adjusting the moving speed, a speed increment corresponding to the pressure for adjusting the moving speed, and calculating a sum of a current speed of the moving object 20 and the speed increment as the adjusted moving speed.

In some other implementations, the control device 10 can be configured to adjust the moving speed of the moving object 20 by obtaining, based on the pressure for adjusting the moving speed, an acceleration corresponding to the pressure for adjusting the moving speed, and calculating the adjusted moving speed based on the current speed of the moving object 20 and the acceleration.

In some other implementations, the control device 10 can be configured to adjust the moving speed of the moving object 20 by obtaining an initial pressure corresponding to the current speed of the moving object 20, obtaining a current pressure applied by the user that decreases from the initial pressure, and controlling the moving object 20 to reduce the moving speed based on the current pressure.

In some other implementations, the control device 10 can be configured to adjust the moving speed of the moving object 20 by obtaining the initial pressure corresponding to the current speed of the moving object 20, obtaining a current pressure applied by the user that increases from the initial pressure, and controlling the moving object 20 to increase the moving speed based on the current pressure.

In the scenario that the control device 10 controls the photographing parameters of the moving object 20, the control device 10 can be configured to obtain, based on a photographing parameter adjusting operation performed by a user, a photographing parameter to be adjusted and a pressure applied by the user for adjusting the photographing parameter, adjust the photographing parameter based on the pressure, and send a photographing parameter control command to the moving object 20. The photographing parameter control command can be used to control the moving object 20 to photograph during movement by using the photographing parameter.

The moving object 20 can be configured to receive the photographing parameter control command, and photograph during movement by using the photographing parameter based on the photographing parameter control command.

In some implementations, multiple pressure forces are applied by the user. The control device 10 can be configured to adjust the photographing parameter by calculating an average or a sum of the multiple pressure forces and adjusting the photographing parameter based on the average or the sum of the multiple pressure forces.

In some other implementations, the control device 10 can be configured to adjust the photographing parameter by obtaining, based on the pressure for adjusting the photographing parameter, a parameter increment of the photographing parameter corresponding to the pressure, and calculating a sum of the parameter value of the current photographing parameter of the moving object 20 and the parameter increment as the parameter value of the adjusted photographing parameter.

In some other implementations, the control device 10 can be configured to obtain the pressure applied by the user for adjusting the photographing parameter by obtaining an initial pressure applied by the user that corresponds to a current photographing parameter of the moving object 20, and obtaining a current pressure applied by the user that decreases from the initial pressure. Correspondingly, the control device 10 can be configured to adjust the photographing parameter by reducing the parameter value of the photographing parameter of the moving object 20 based on the current pressure.

In some other implementations, the control device 10 can be configured to obtain the pressure applied by the user for adjusting the photographing parameter by obtaining the initial pressure applied by the user that corresponds to the current photographing parameter of the moving object 20, and obtaining a current pressure applied by the user that increases from the initial pressure. Correspondingly, the control device 10 can be configured to adjust the photographing parameter by increasing the parameter value of the photographing parameter of the moving object 20 based on the current pressure.

In some other implementations, the control device 10 can be configured to obtain the photographing parameter to be adjusted by obtaining, based on the photographing parameter adjusting operation performed by the user, an initially-selected photographing parameter in multiple photographing parameters displayed in the display interface and a pressure applied by the user for selecting a photographing parameter from the multiple photographing parameters, adjusting a location of the initially-selected photographing parameter, and determining the location of the initially-selected photographing parameter after the adjustment as a location of the photographing parameter that the user wishes to adjust.

The disclosed system can be used to implement the various embodiments of the methods described above.

Figure 13:
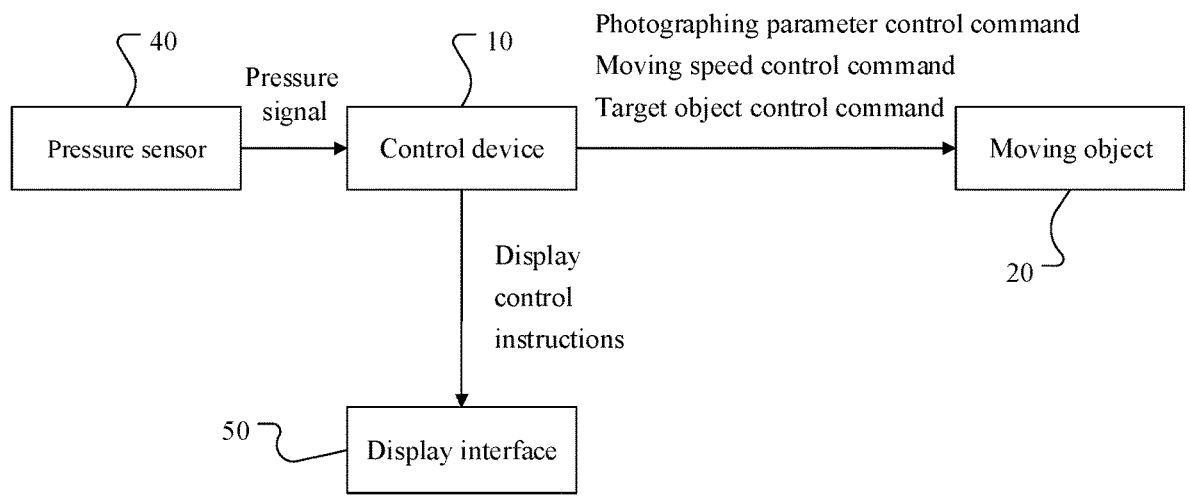
FIG. 13 illustrates a schematic structural diagram of another example of system for controlling movement of a moving object in accordance with the present disclosure.

FIG. 13 illustrates a schematic structural diagram of another example of system for controlling movement of a moving object in accordance with the present disclosure. The system shown in FIG. 13 is similar to the system shown in FIG. 12, except that the system shown in FIG. 13 further includes a pressure sensor 40.

In the scenario that the control device 10 controls the moving object 20 to move for tracking a target object, the pressure sensor 40 can be configured to detect the pressure applied by the user for adjusting the target object range, and send a signal indicating the pressure to the control device 10. The control device 10 can be configured to obtain the pressure applied by the user for adjusting the target object range by receiving the signal indicating the pressure.

In the scenario that the control device 10 controls the moving speed of the moving object 20, the pressure sensor 40 can be configured to detect the pressure applied by the user for adjusting the moving speed, and send a signal indicating the pressure to the control device 10. The control device 10 can be configured to obtain the pressure applied by the user for adjusting the moving speed by receiving the signal indicating the pressure.

In the scenario that the control device 10 controls the photographing parameters of the moving object 20, the pressure sensor 40 can be configured to detect the pressure applied by the user for adjusting the photographing parameter, and send a signal indicating the pressure to the control device 10. The control device 10 can be configured to obtain the pressure applied by the user for adjusting the photographing parameter by receiving the signal indicating the pressure.

In some embodiments, as shown in FIG. 13, the system further includes a display interface 50.

In the scenario that the control device 10 controls the moving object 20 to move for tracking a target object, the display interface 50 can be configured to display images captured by the moving object 20. For example, as shown in FIG. 12, after the control device 10 sends the target object control command to the UAV, the photographing device of the UAV can capture images of the tracked target object. The UAV can send a captured image to the control device 10. In response to receiving the image, the control device 10 can generate a display control instruction. The display control instruction can be used to control the display interface to display the image. The control device 10 can send the display control instruction to the display interface 50. The display interface 50 can display the image based on the display control instruction.

In the scenario that the control device 10 controls the moving speed of the moving object 20, the display interface 50 can be configured to display the adjusted moving speed of the moving object 20. For example, the control device 10 can adjust the moving speed based on the pressure applied by the user, and send a display control instruction to the display interface 50. The display control instruction can be used to indicate the moving speed corresponding to the current pressure. The display interface 50 can display the moving speed corresponding to the pressure applied by the user based on the display control instruction.

In the scenario that the control device 10 controls the photographing parameters of the moving object 20, the display interface 50 can be configured to display the adjusted photographing parameter of the moving object 20. For example, the control device 10 can adjust the photographing parameter based on the pressure applied by the user, and send a display control instruction to the display interface 50. The display control instruction can be used to indicate parameter information of the photographing parameter corresponding to the current pressure. The display interface 50 can display the parameter information of the photographing parameter corresponding to the pressure applied by the user based on the display control instructions.

It is noted that, the above-described pressure sensor 40 may be a component integrated on the control device 10, or may be a component independent from the control device 10. The above-described display interface 50 may also be integrated on the control device 10, or may be a component independent from the control device 10. In some embodiments, the above-described pressure sensor 40 and the display interface 50 may be integrated as one component and independent from the control device 10.

In accordance with the present disclosure, there is also provided a computer-readable storage medium storing program codes that, when executed by the control device 10, cause the control device 10 to execute a method for controlling movement of a moving object consistent with the disclosure, such as one of the above-described exemplary methods.

It is noted that, the flowcharts and block diagrams in the figures illustrate various embodiments of the disclosed method, media and system, as well as architectures, functions and operations that can be implemented by a computer program product. In this case, each block of the flowcharts or block diagrams may represent a module, a code segment, a portion of program code. Each module, each code segment, and each portion of program code can include one or more executable instructions for implementing predetermined logical functions.

It is also noted that, in some alternative implementations, the functions illustrated in the blocks be executed or performed in any order or sequence not limited to the order and sequence shown and described in the figures. For example, two consecutive blocks may actually be executed substantially simultaneously where appropriate or in parallel to reduce latency and processing times, or even be executed in a reverse order depending on the functionality involved in.

Those of ordinary skill in the art will appreciate that the exemplary elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

For simplification purposes, detailed descriptions of the operations of exemplary systems, devices, and units may be omitted and references can be made to the descriptions of the exemplary methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the disclosure, such as one of the exemplary methods described above. The storage medium can be any medium that can store program codes, for example, a USB disk, a mobile hard disk, a read-only memory (ROM), a random access memory (RAM), a magnetic disk, or an optical disk.

The provision of the examples described herein (as well as clauses phrased as "such as," "e.g.," "including," or the like) should not be interpreted as limiting the disclosure to the specific examples; rather, the examples are intended to illustrate only some of many possible aspects.

Although the present disclosure has been described and illustrated in the foregoing illustrative embodiments, it is understood that the present disclosure has been made only by way of example, and that numerous changes in the details of embodiment of the present disclosure can be made without departing from the spirit and scope of the present disclosure. Features of the disclosed embodiments can be combined and rearranged in various ways. Without departing from the spirit and scope of the present disclosure, modifications, equivalents, or improvements to the present disclosure are conceivable to those skilled in the art and are intended to be encompassed within the scope of the present disclosure.

What is claimed is:

1. A method for controlling movement of a moving object, comprising:
receiving, by a pressure-sensitive input device, a target object selecting operation, wherein the target object selecting operation includes applying a first pressure force including a first perpendicular force component on a first pressure area of the pressure-sensitive input component and a second pressure force including a second perpendicular force component and a parallel force component on a second pressure area different from the first pressure area of the pressure-sensitive input component, wherein the first and the second perpendicular force components are in a first direction perpendicular to a surface of the pressure-sensitive input component and the parallel force component of the second pressure area is in a second direction parallel to the surface of the pressure-sensitive input component;
determining, by a processor, a location of a center point of the target object range on a display interface based on a center point of the first pressure area;
determining, by the processor, a size of the target object range according to a sum of magnitudes of the first and the second perpendicular force components corresponding to two different pressure areas;
adjusting, by the processor, the location of the center point of the target range according to the second direction of the parallel force component on the second pressure area;
determining, by the processor, based on the adjusted target object range, an image object in the target object range as a target object tracked by the moving object;
displaying images captured by the moving object while tracking the target object.

2. The method of claim 1, further comprising:
determining locations and sizes of a plurality of target object ranges; and
determining image objects in the plurality of target object ranges as a plurality of target objects tracked by the moving object.

3. The method of claim 2, further comprising:
displaying images captured by the moving object while tracking the plurality of tracked target objects on a plurality of split regions of the display interface, respectively.

4. An apparatus for controlling movement of a moving object, comprising:
a memory storing a computer program; and
a processor configured to execute the computer program to:

receive, from a pressure-sensitive input device, a target object selecting operation, wherein the target object selecting operation includes applying a first pressure force including a first perpendicular force component on a first pressure area of the pressure-sensitive input component and a second pressure force including a second perpendicular force component and a parallel force component on a second pressure area different from the first pressure area of the pressure-sensitive input component, wherein the first and the second perpendicular force components are in a first direction perpendicular to a surface of the pressure-sensitive input component and the parallel force component of the second pressure area is in a second direction parallel to the surface of the pressure-sensitive input component;

determine a location of a center point of the target object range on a display interface based on a center point of the first pressure area;

determine a size of the target object range according to a sum of magnitudes of the first and the second perpendicular force components corresponding to two different pressure areas;

adjust the location of the center point of the target range according to the second direction of the parallel force component on the second pressure area;

determine, based on the adjusted target object range, an image object in the target object range as a target object tracked by the moving object;

display images captured by the moving object while tracking the target object.

5. The apparatus of claim 4, wherein the processor is further configured to execute the computer program to:

determine locations and sizes of a plurality of target object ranges; and determine image objects in the plurality of target object ranges as a plurality of target objects tracked by the moving object.

6. The apparatus of claim 5, wherein the processor is further configured to execute the computer program to:

display images captured by the moving object while tracking the plurality of tracked target objects on a plurality of split regions of the display interface, respectively.

7. A movement control system comprising:
a processor; and
a moving object,
wherein the processor is configured to:
receive, from a pressure-sensitive input device, a target object selecting operation, wherein the target object selecting operation includes applying a first pressure force including a first perpendicular force component on a first pressure area of the pressure-sensitive input component and a second pressure force including a second perpendicular force component and a parallel force component on a second pressure area different from the first pressure area of the pressure-sensitive input component, wherein the first and the second perpendicular force components are in a first direction perpendicular to a surface of the pressure-sensitive input component and the parallel force component of the second pressure area is in a second direction parallel to the surface of the pressure-sensitive input component;

determine a location of a center point of the target object range on a display interface based on a center point of the first pressure area;

determining a size of the target object range according to a sum of magnitudes of the first and the second perpendicular force components corresponding to two different pressure areas;

adjusting, by the processor, the location of the center point of the target range according to the second direction of the parallel force component on the second pressure area;

determine, based on the adjusted target object range, an image object in the target object range as a target object tracked by the moving object; and send a target object control command to the moving object, the target object control command being configured to control the moving object to determine the image object in the target object range on the display interface as the target object, and cause display of images captured by the moving object while tracking the target object;

wherein the moving object is configured to:
receive the target object control command; and
track the target object based on the target object control command.

* * * * *